(12) United States Patent
Hiratsuka et al.

(10) Patent No.: US 10,156,641 B2
(45) Date of Patent: Dec. 18, 2018

(54) RADIATION IMAGE SENSING APPARATUS AND RADIATION IMAGE SENSING SYSTEM

(71) Applicant: CANON KABUSHIKI KAISHA, Tokyo (JP)

(72) Inventors: Youjirou Hiratsuka, Yokohama (JP); Takahiro Koyanagi, Kawasaki (JP); Hiroto Kondo, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 128 days.

(21) Appl. No.: 15/046,605

(22) Filed: Feb. 18, 2016

(65) Prior Publication Data

US 2016/0252629 A1 Sep. 1, 2016

(30) Foreign Application Priority Data

Feb. 26, 2015 (JP) .................................. 2015-037294

(51) Int. Cl.
*G01T 1/20* (2006.01)
*H04N 5/32* (2006.01)

(52) U.S. Cl.
CPC ............. *G01T 1/2018* (2013.01); *H04N 5/32* (2013.01)

(58) Field of Classification Search
CPC .................................................. G01T 1/2018
See application file for complete search history.

(56) References Cited

U.S. PATENT DOCUMENTS

| 8,513,633 | B2 | 8/2013 | Koyanagi | |
|---|---|---|---|---|
| 2005/0056789 | A1* | 3/2005 | Spahn | A61B 6/00 250/370.09 |
| 2009/0202038 | A1* | 8/2009 | Wu | A61B 6/4283 378/62 |
| 2012/0097857 | A1* | 4/2012 | Hayatsu | G01T 1/2018 250/366 |
| 2015/0253441 | A1* | 9/2015 | Horiuchi | A61B 6/4405 250/361 R |

(Continued)

FOREIGN PATENT DOCUMENTS

| JP | 2002-131437 | 5/2002 |
|---|---|---|
| JP | 2002-286848 | 10/2002 |
| JP | 2004-061116 | 2/2004 |

(Continued)

*Primary Examiner* — David P Porta
*Assistant Examiner* — Jeremy S Valentiner
(74) *Attorney, Agent, or Firm* — Fitzpatrick Cella Harper and Scinto

(57) ABSTRACT

A radiation image sensing apparatus includes an image sensing, a circuit component, a supporting plate including first and second faces and configured to support the image sensing panel with the first face and support the circuit component with the second face, a connecting portion configured to connect the image sensing panel and the circuit component, and a housing configured to enclose the image sensing panel, the circuit component, the supporting plate and the connecting portion. An outer periphery of the supporting plate includes a concave portion and a projecting portion, and the connecting portion connects the image sensing panel and the circuit component through outside the concave portion. The outer edge of the concave portion is positioned inside an outer edge of the image sensing panel upon orthogonal projection onto the first face.

16 Claims, 11 Drawing Sheets

(56) References Cited

U.S. PATENT DOCUMENTS

2015/0342553 A1 12/2015 Sato et al.

FOREIGN PATENT DOCUMENTS

| | | |
|---|---|---|
| JP | 2009-189789 | 8/2009 |
| JP | 2010-237162 | 10/2010 |
| JP | 2012-132703 | 7/2012 |
| JP | 2012-132768 | 7/2012 |
| JP | 2013-019794 | 1/2013 |

* cited by examiner

F I G. 1A
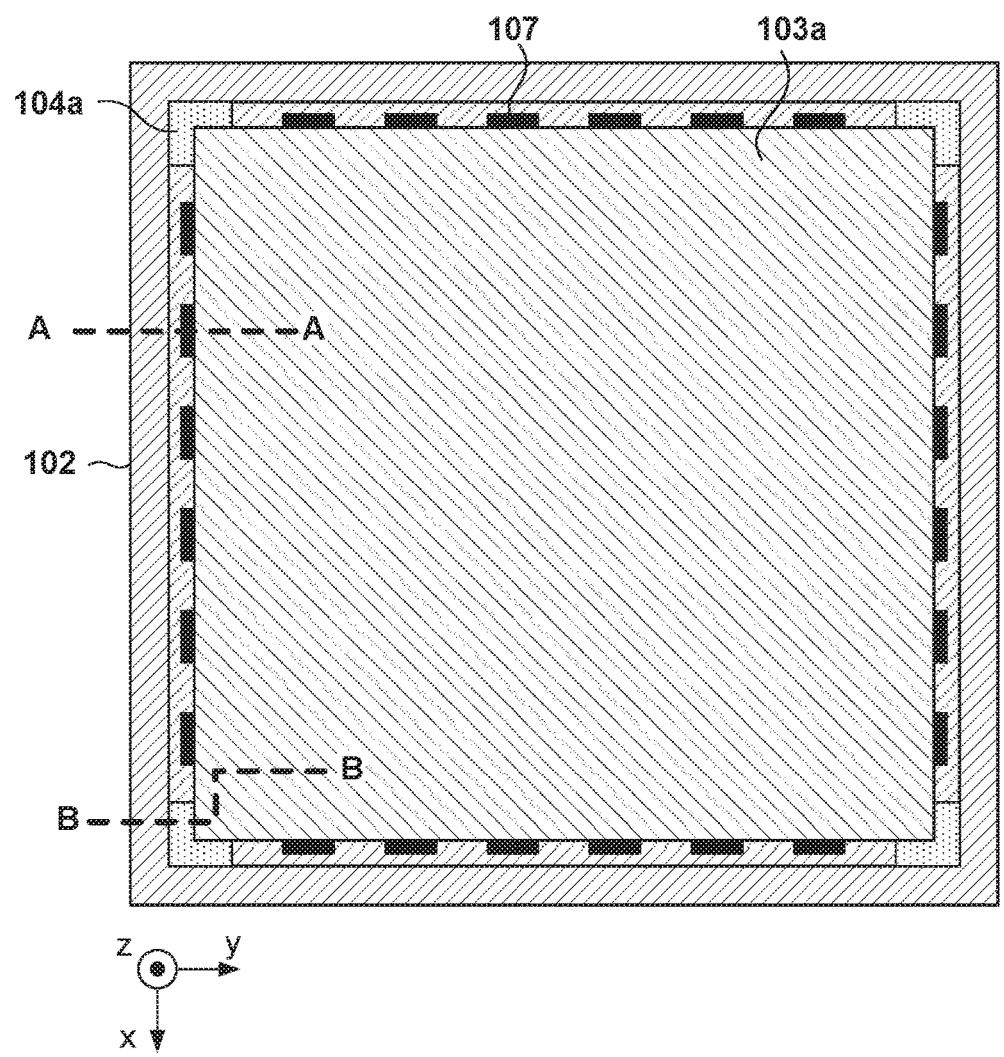

A-A

B-B

RADIATION IMAGE SENSING APPARATUS AND RADIATION IMAGE SENSING SYSTEM

BACKGROUND OF THE INVENTION

Field of the Invention

The present invention relates to a radiation image sensing apparatus and a radiation image sensing system.

Description of the Related Art

There is a radiation image sensing apparatus that includes an image sensing panel in which a plurality of elements for detecting radiation are two-dimensionally arranged. In such a radiation image sensing apparatus, each element can include a scintillator that converts radiation into light and a photoelectric conversion element that converts the light converted by the scintillator into an electrical signal. The scintillator can be shared by the plurality of elements. Alternatively, each element can include a conversion element that directly converts radiation into an electrical signal. The image sensing panel can be supported by a supporting plate.

Japanese Patent Laid-Open No. 2010-237162 discloses a radiation detection apparatus that includes a TFT substrate in which connecting terminals are arranged, a counter substrate, a radiation conversion layer 50 arranged between the TFT substrate and the counter substrate, and wirings which are connected to the respective connecting terminals. Japanese Patent Laid-Open No. 2004-61116 discloses a radiation detection apparatus that is configured by bonding a scintillator obtained by forming a phosphor layer on a scintillator substrate and a sensor panel obtained by forming a photoelectric conversion pixel portion area on a glass substrate. In this radiation detection apparatus, one end of a flexible cable is connected to the upper face side of the sensor panel.

In the radiation detection apparatus disclosed in Japanese Patent Laid-Open No. 2010-237162, it is necessary to lead the wirings across the outside of the outer periphery of the counter substrate in order to lead the wirings connected to the connecting terminals of the TFT substrate to the lower face side of the counter substrate. In a similar manner, in the radiation detection apparatus disclosed in Japanese Patent Laid-Open No. 2004-61116, it is necessary to lead the flexible cable across the outside of the sensor panel in order to lead the flexible cable from the upper face side of the sensor panel to the lower face side. Therefore, in the respective radiation image detection apparatuses disclosed in Japanese Patent Laid-Open Nos. 2010-237162 and 2004-61116, the dimension of the housing can increase since the wirings or the flexible cable is led to pass outside the area occupied by the radiation detection apparatus.

SUMMARY OF THE INVENTION

The present invention provides a radiation image sensing apparatus advantageous for downsizing the housing.

One of aspects of the present invention provides a radiation image sensing apparatus comprising: an image sensing panel including a plurality of elements configured to detect radiation; a circuit component configured to drive the image sensing panel and process a signal from the image sensing panel; a supporting plate including a first face and a second face which oppose each other and configured to support the image sensing panel with the first face and support the circuit component with the second face; a connecting portion configured to connect the image sensing panel and the circuit component; and a housing configured to enclose the image sensing panel, the circuit component, the supporting plate, and the connecting portion, wherein an outer periphery of the supporting plate includes a concave portion and a projecting portion which projects outside the concave portion, and the connecting portion connects the image sensing panel and the circuit component through outside the concave portion, and the outer edge of the concave portion is positioned inside an outer edge of the image sensing panel upon orthogonal projection onto the first face.

Further features of the present invention will become apparent from the following description of exemplary embodiments with reference to the attached drawings.

BRIEF DESCRIPTION OF THE DRAWINGS

FIGS. 1A to 1C are sectional views each showing the arrangement of a radiation image sensing apparatus according to the first embodiment of the present invention;

DESCRIPTION OF THE EMBODIMENTS

Exemplary embodiments of the present invention will be described below with reference to the attached drawings.

Figure 1B:
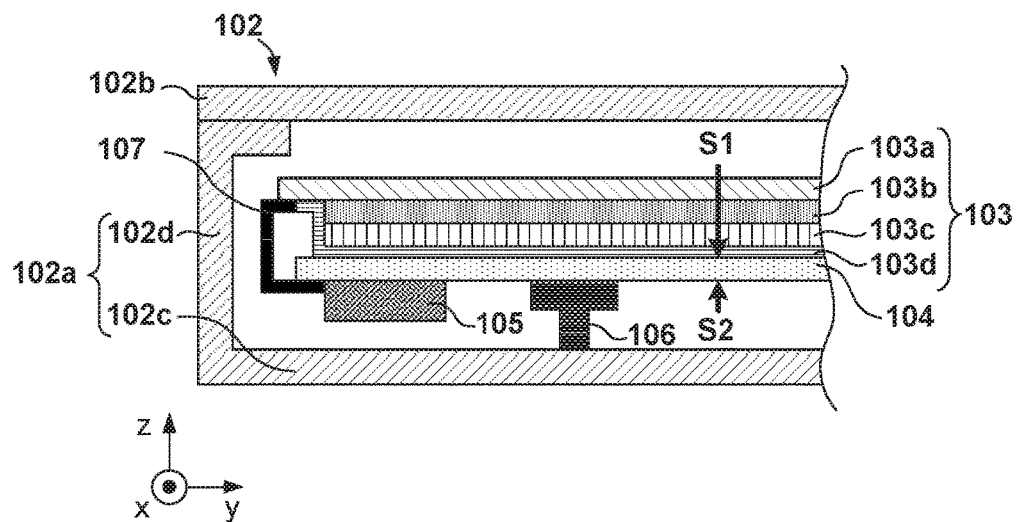
Figure 1C:
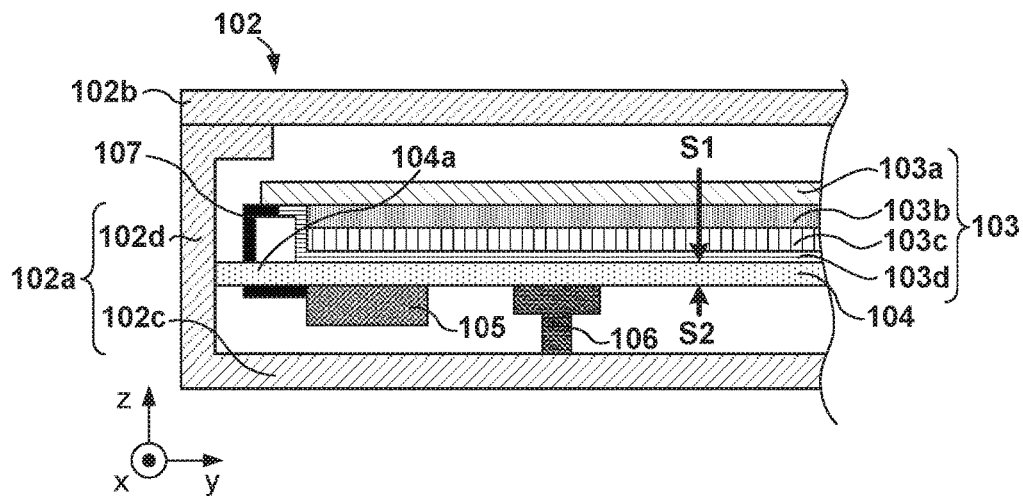
Figure 2A:
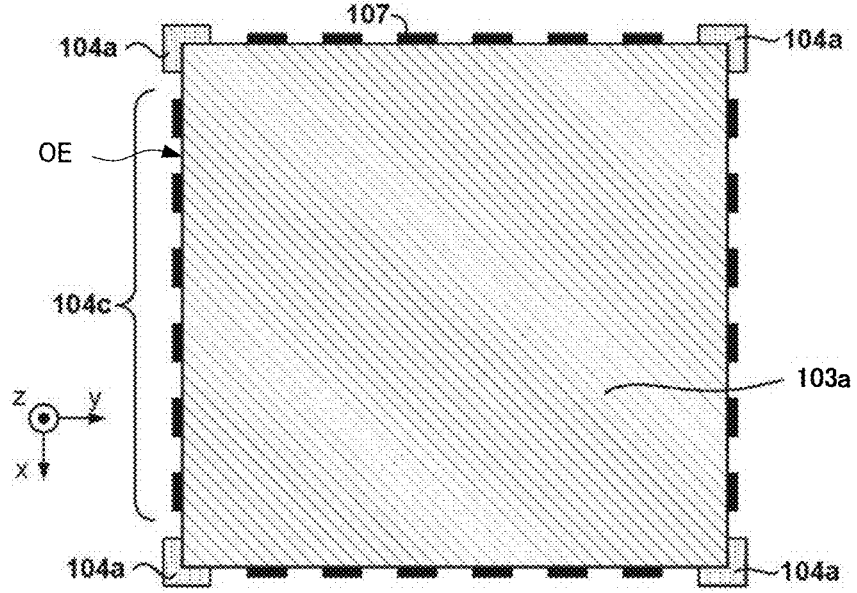
FIGS. 2A and 2B are a plan view and a bottom view, respectively, showing the arrangement of the radiation image sensing apparatus according to the first embodiment of the present invention.
Figure 2B:
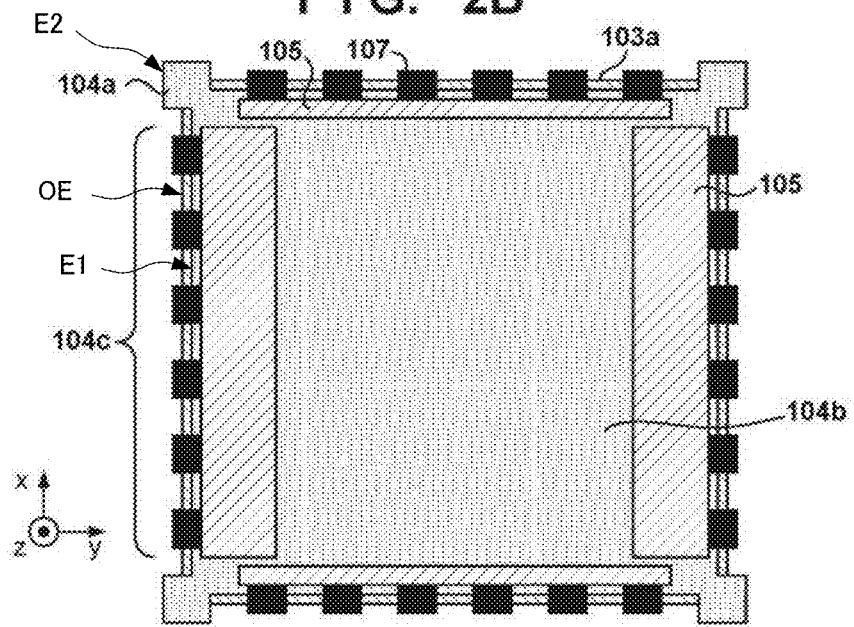

A radiation image sensing apparatus 10 according to the first embodiment of the present invention will be described with reference to FIGS. 1A to 1C, 2A, and 2B. FIG. 1A is a sectional view in which the radiation image sensing apparatus 10 has been cut along a plane parallel to the x-y plane, FIG. 1B is a sectional view taken along line A-A of FIG. 1A, and FIG. 1C is a sectional view taken along a line B-B of FIG. 1A. FIG. 2A is a plan view in which a housing 102 has been removed from the radiation image sensing apparatus 10, and FIG. 2B is a bottom view in which the housing 102 and joints 106 have been removed from the radiation image sensing apparatus 10.

The radiation image sensing apparatus 10 includes an image sensing panel 103, a supporting plate 104, circuit components 105, connecting portions 107, and the housing 102. The image sensing panel 103 includes a plurality of elements (pixels) for detecting radiation. The image sensing panel 103 can include, for example, a substrate 103a, an array 103b in which a plurality of photoelectric conversion elements are two-dimensionally arranged, and a scintillator 103c. The scintillator 103c converts radiation into light, and the photoelectric conversion elements convert the light into electrical signals. The scintillator 103c can be shared by the plurality of photoelectric conversion elements. One element of the image sensing panel 103 can include one photoelectric conversion element. The image sensing panel 103 can include a reflective sheet 103d.

In one example, the radiation that enters the radiation image sensing apparatus 10 by being emitted from a radiation source and transmitted through an object to be inspected enters the scintillator 103c through the array 103b after being transmitted through the substrate 103a. The light converted from radiation by the scintillator 103c enters the photoelectric conversion element array 103b. The reflective sheet 103d reflects the light converted by the scintillator 103c toward the array 103b. This kind of an arrangement is advantageous in improving the detection efficiency of light by the photoelectric conversion elements and improving the sharpness of the image to be sensed. Although the scintillator 103c is provided in this example, the scintillator 103c is unnecessary in the case of an arrangement in which the array 103b is formed by elements that can directly convert radiation into electrical signals.

For the substrate 103a, for example, a glass plate is advantageous in that it has no chemical action with semiconductor elements such as the photoelectric conversion elements, can withstand the temperature of a semiconductor manufacture process, and has dimensional stability. The array 103b in which the plurality of photoelectric conversion elements are two-dimensionally arranged can be formed on the surface of the substrate 103a by a semiconductor manufacture process. The scintillator 103c can be arranged on the array 103b. The scintillator 103c can be covered by the reflective sheet 103d. The reflective sheet 103d can be arranged so as to cover the side faces of the scintillator 103c and a part or all of the outer portions of the scintillator 103c out of the surface of the substrate 103a.

The circuit components 105 process the signals from the image sensing panels 103 by driving the image sensing panel 103. Each circuit component 105 can include, for example, a circuit that gives a bias potential to each photoelectric conversion element, a circuit that selects a row in the array 103b, and a circuit that reads out the signals from the array 103b. The supporting plate 104 includes a first face S1 and a second face S2 which oppose each other. The supporting plate 104 supports the image sensing panel 103 by the first face S1 and supports the circuit components 105 by the second face S2. The connecting portions 107 connect the image sensing panel 103 and the circuit components 105. Each connecting portion 107 can include, for example, a flexible printed circuit (FPC).

The housing 102 encloses the image sensing panel 103, the circuit components 105, the supporting plate 104, and the connecting portions 107. The housing 102 includes a main body 102a with an opening and a first plate portion (lid) 102b which closes the opening. The main body 102a includes a second plate portion 102c and a frame portion 102d. The frame portion 102d forms the side walls of the housing 102. The first plate portion 102b and the second plate portion 102c are arranged in parallel to each other and form the front face and the back face of the radiation image sensing apparatus 10. In one example, the radiation which is emitted from the radiation source and transmitted through the object to be inspected enters the first plate portion 102b, enters the substrate 103a by being transmitted through the first plate portion 102b, and enters the scintillator 103c through the array 103b after being transmitted through the substrate 103a. The first plate portion 102b can be formed from a material, such as CFRP, with good transmission of radiation.

The joints 106 join the second plate portion 102c and the supporting plate 104. Typically, a plurality of joints 106 can be provided. Each joint 106 can be arranged between the second plate portion 102c and the second face S2 of the supporting plate 104. Each circuit component 105 can be arranged between the second plate portion 102c and the second face S2 of the supporting plate 104. Each joint 106 can be formed by an insulator such as polycarbonate resin.

The outer periphery of the supporting plate 104 includes concave portions 104c and one or a plurality of projecting portions 104a which project outside the concave portions 104c, and the connecting portions 107 connect the image sensing panel 103 and the circuit components 105 by passing outside (the spaces of) the concave portions 104c. This kind of arrangement is advantageous in downsizing the radiation image sensing apparatus 10 or the housing 102. From one viewpoint, the supporting plate 104 can be a plate member which includes a base portion 104b to support the image panel 103 and one or a plurality of projecting portions 104a. In this viewpoint, the concave portions 104c are portions in which the projecting portions 104a do not exist in the outer periphery of the supporting plate 104. In the examples shown in FIGS. 1A to 1C, 2A, and 2B, the supporting plate 104 includes four projecting portions 104a. This form can be understood as a form in which the projecting portions 104a are provided on the respective vertices of the base portion 104b having a rectangular shape.

The supporting plate 104 and the image sensing panel 103 can be arranged so that the outer edges of the concave portions 104c of the supporting plate 104 are positioned inside the outer edges of the image sensing panel 103 upon orthogonal projection onto the first face S1 of the supporting plate 104. This kind of arrangement is advantageous in ensuring a space for the connecting portions 107 in between the housing 102 and the concave portions 104c of the supporting plate 104 without increasing the size of the housing 102. This arrangement is advantageous in so-called slim bezel formation, that is, in decreasing the distance between the housing 102 and the outer edges of the imaging area (the area in which the photoelectric conversion elements are arrayed) of the array 103.

The supporting plate 104 and the image sensing panel 103 can be arranged so that the outer edges of the projecting portions 104a of the supporting plate 104 are positioned outside the outer edges of the image sensing panel 103 upon orthogonal projection onto the first face S1 of the supporting plate 104. This kind of arrangement is advantageous in protecting the image sensing panel 103 at the time of assembly or maintenance of the radiation image sensing apparatus 10.

The supporting plate 104 can have a structure in which the projecting portions 104a and the base portion 104b which is the portion supporting the image sensing panel are formed integrally by the same material. This kind of a structure is superior in that it can easily increase the rigidity of the supporting plate 104 and facilitate the manufacturing of the supporting plate 104. The projecting portions 104a and the base portion 104b which is the portion supporting the image sensing panel 103 of the supporting plate 104 can be formed by a conductive material (for example, metal). This kind of arrangement is advantageous in reducing the transmission of external noise and noise from the circuit components 105 to the image sensing panel 103.

Figure 3A:
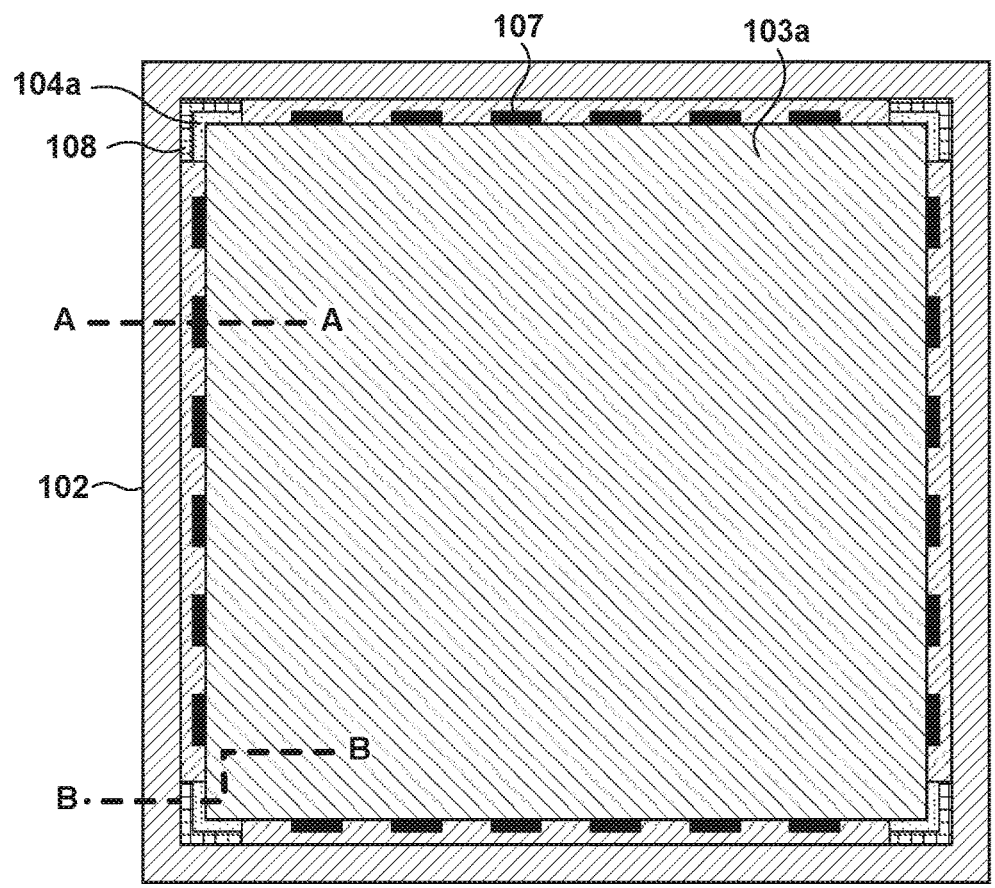
FIGS. 3A to 3C are sectional views each showing the arrangement of a radiation image sensing apparatus according to the second embodiment of the present invention.
Figure 3B:
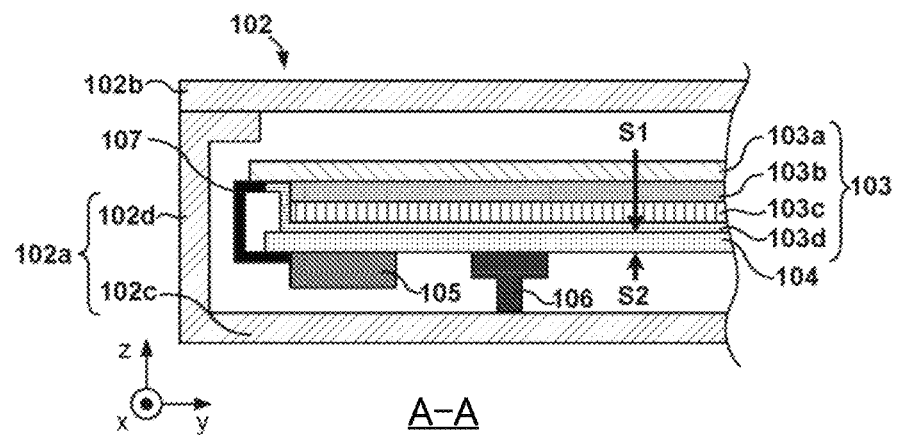
Figure 3C:
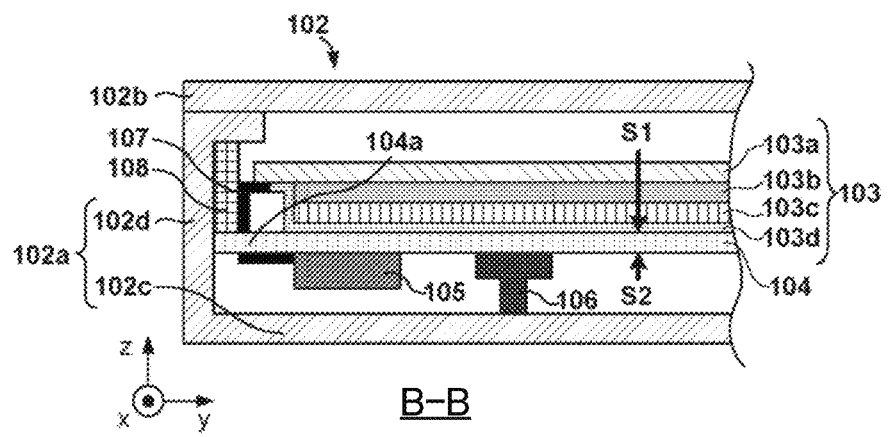
Figure 4A:
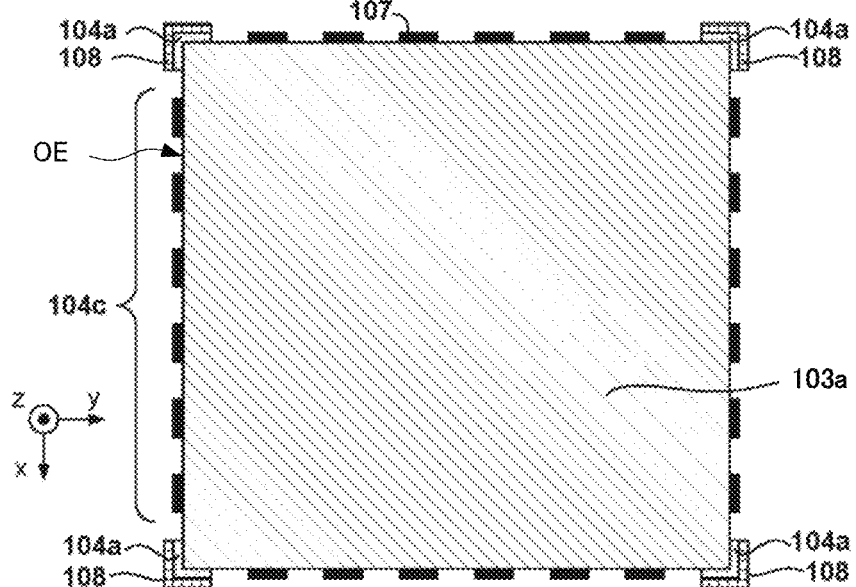
FIGS. 4A and 4B are a plan view and a bottom view, respectively, showing the arrangement of the radiation image sensing apparatus according to the second embodiment of the present invention.
Figure 4B:
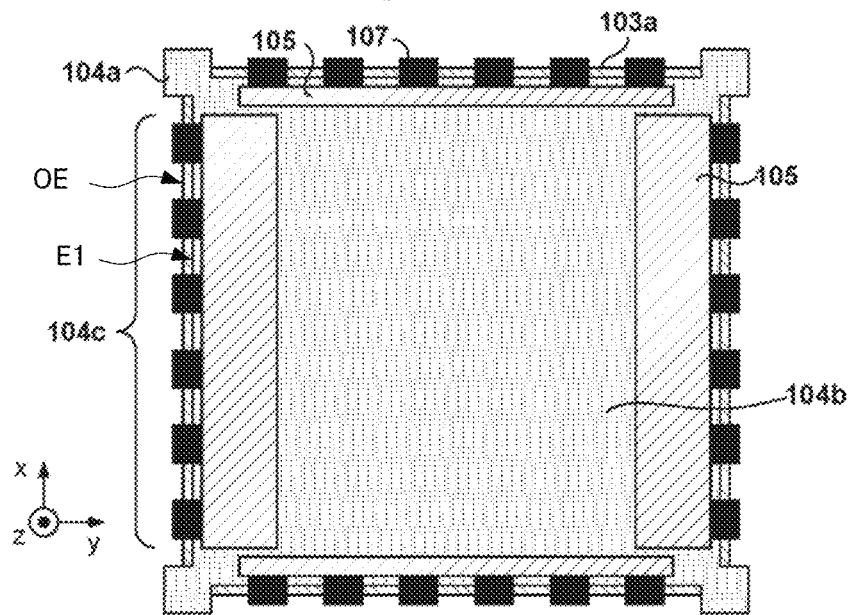

A radiation image sensing apparatus 10 according to the second embodiment of the present invention will be described with reference to FIGS. 3A to 3C, 4A, and 4B. FIG. 3A is a sectional view in which the radiation image sensing apparatus 10 has been cut along a plane parallel to the x-y plane, FIG. 3B is a sectional view taken along line A-A of FIG. 3A, and FIG. 3C is a sectional view taken along a line B-B of FIG. 3A. FIG. 4A is a plan view in which a housing 102 has been removed from the radiation image sensing apparatus 10, and FIG. 4B is a bottom view in which the housing 102 and joints 106 have been removed from the radiation image sensing apparatus 10. Matters not mentioned in the second embodiment can comply with the first embodiment.

The radiation image sensing apparatus 10 according to the second embodiment includes spacers 108. The spacers 108 can be arranged between projecting portions 104a and the housing 102 so as to determine the position of a supporting plate 104 with respect to the housing 102. The spacers 108 are, for example, fixed to the respective projecting portions 104a. The spacers 108 can be arranged so as to determine the position of the supporting plate 104 with respect to a first plate portion 102b of the housing 102 and/or the position of the supporting plate 104 with respect to a frame portion 102d of the housing 102. In the examples shown in FIGS. 3A to 3C, the spacers 108 project to the side (outside) of the frame portion 102d and project the most to the side of the first plate portion 102b upon orthogonal projection onto a first face S1 of the supporting plate 104. In a state in which the spacers 108 are fixed to the supporting plate 104, the spacers 108 have a function to protect an image sensing panel 103 at the time of assembly or maintenance of the radiation image sensing apparatus 10. The spacers 108 can be arranged to electrically insulate the supporting plate 104 and the housing 102 from each other. Each spacer 108 can be formed by an insulator such polycarbonate resin.

Figure 5A:
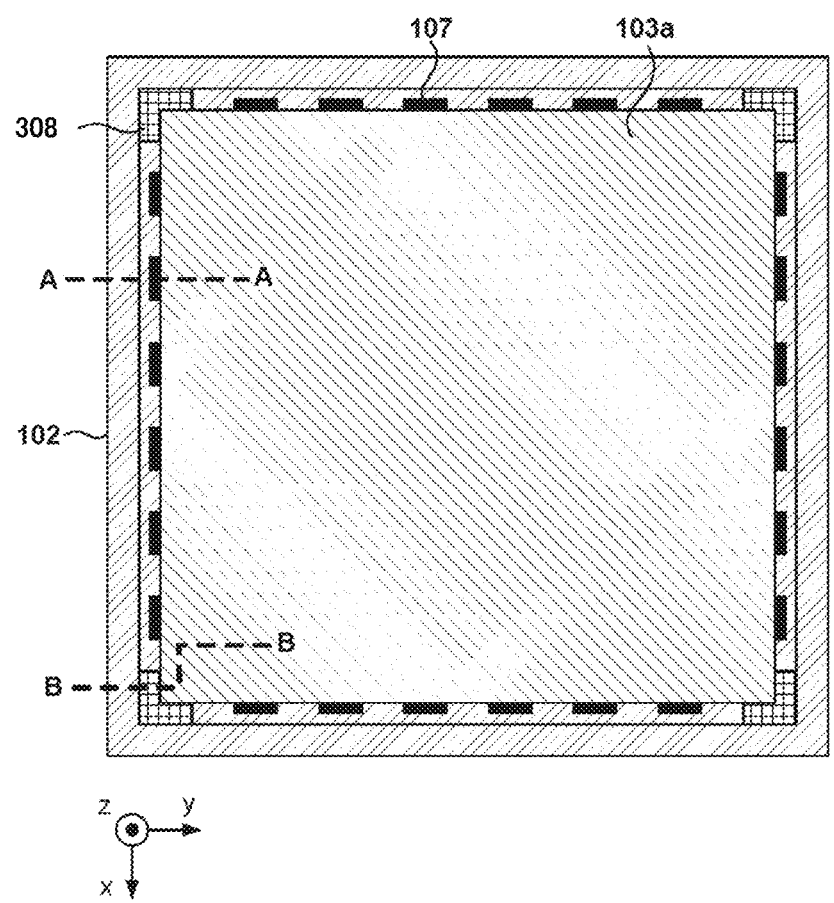
FIGS. 5A to 5C are sectional views each showing the arrangement of a radiation image sensing apparatus according to the third embodiment of the present invention.
Figure 5B:
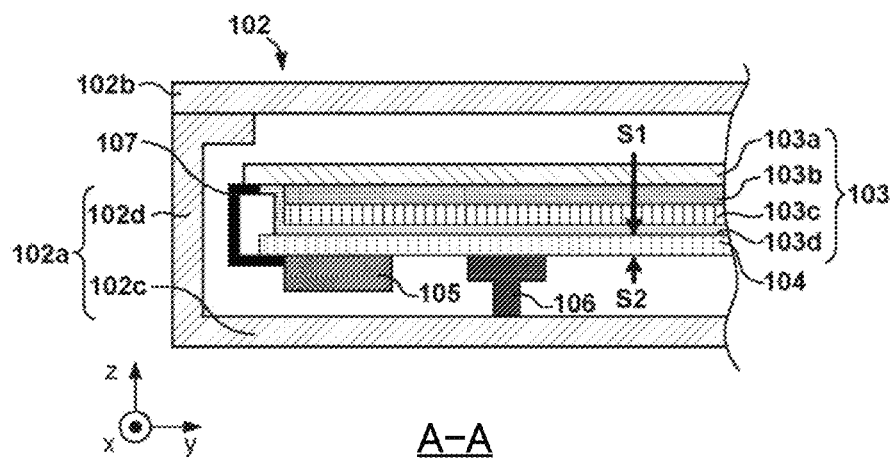
Figure 5C:
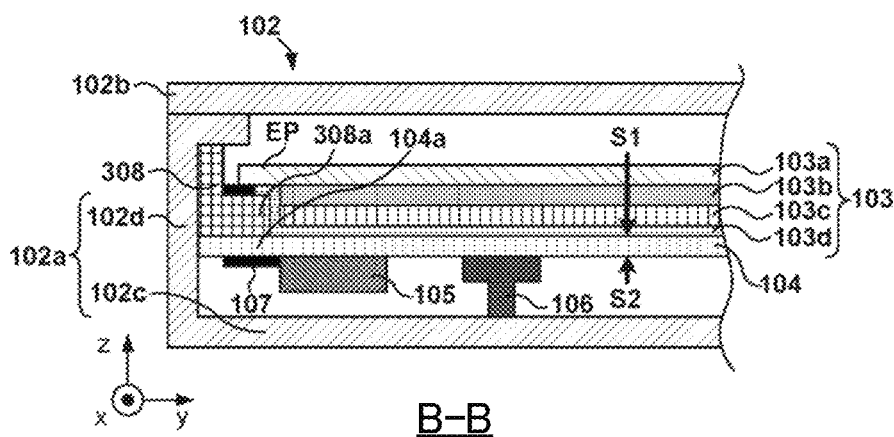

A radiation image sensing apparatus 10 according to the third embodiment of the present invention will be described with reference to FIGS. 5A to 5C. FIG. 5A is a sectional view in which the radiation image sensing apparatus 10 has been cut along a plane parallel to the x-y plane, FIG. 5B is a sectional view taken along line A-A of FIG. 5A, and FIG. 5C is a sectional view taken along a line B-B of FIG. 5A. The radiation image sensing apparatus 10 according to the third embodiment includes an arrangement in which the spacers 108 of the second embodiment have been replaced by spacers 308. The spacers 308 are fixed to respective projecting portions 104a and function in the same manner as the spacers 108.

An array 103b which includes a plurality of photoelectric conversion elements is supported by a substrate 103a and is arranged between the substrate 103a and a supporting plate 104. As exemplified in FIG. 5C, the substrate 103a has end portions EP that project outside. The spacers 308 differ from the spacers 108 of the second embodiment in that they include portions 308a arranged between the end portions EP of the substrate 103a and the projecting portions 104a of the supporting plate 104, respectively. Such spacers 308 can suppress the flexure of the substrate 103a and prevent damage to an image sensing panel 103.

Figure 6A:
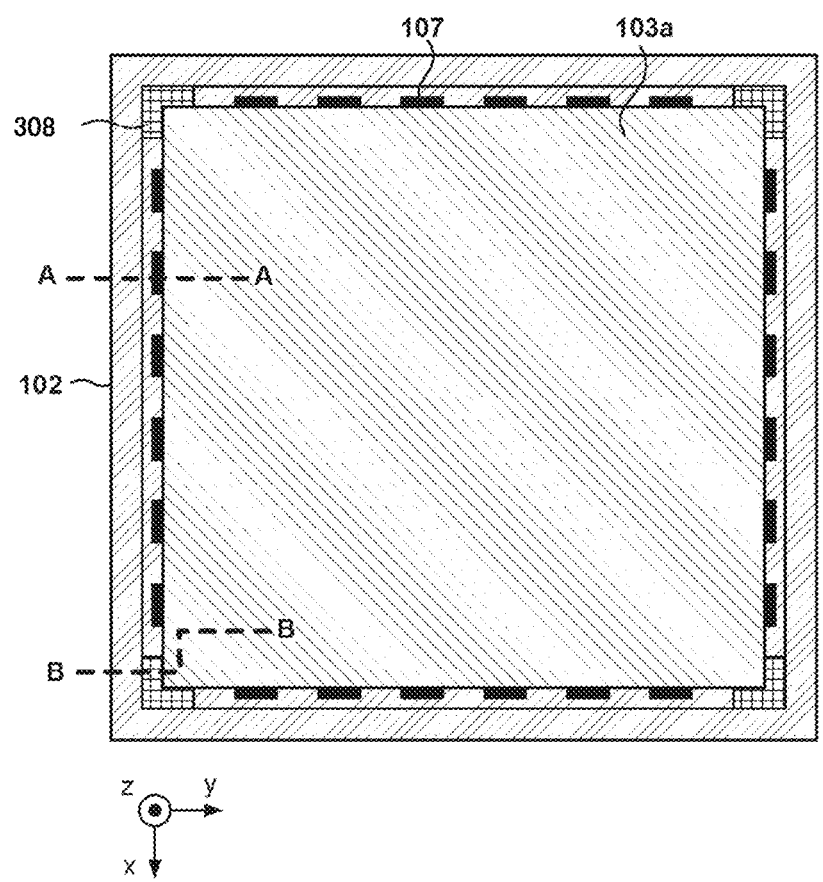
FIGS. 6A to 6C are sectional views each showing the arrangement of a radiation image sensing apparatus according to the fourth embodiment of the present invention.
Figure 6B:
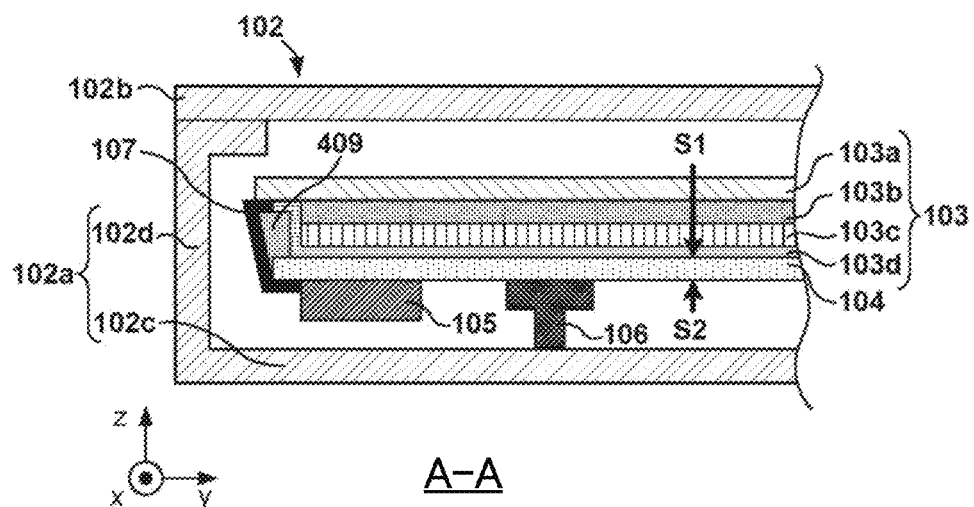
Figure 6C:
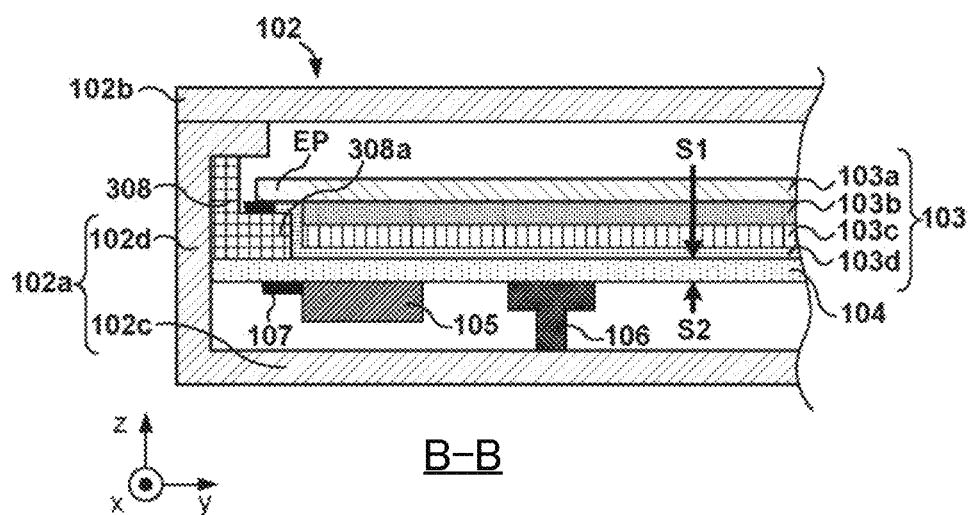
Figure 7:
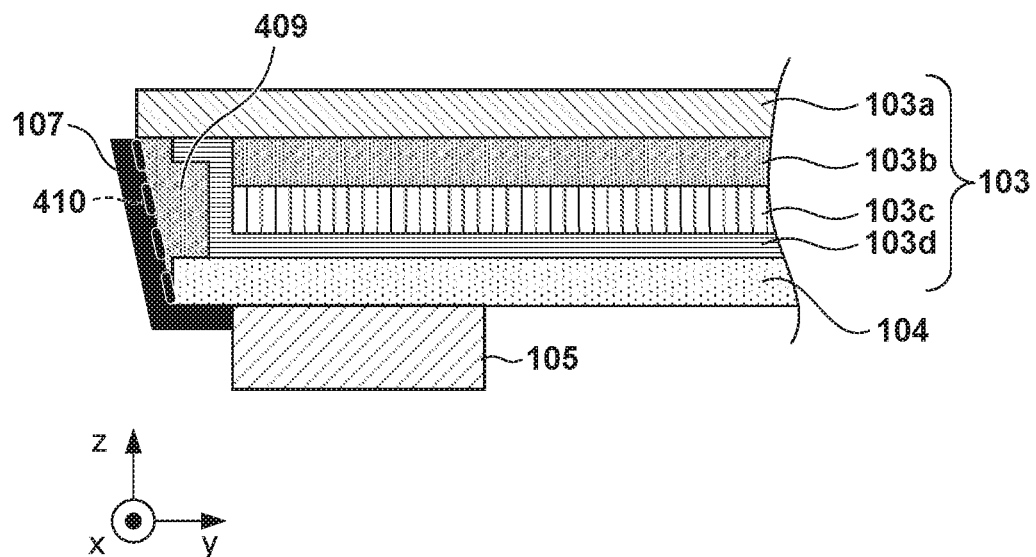
FIG. 7 is a sectional view showing the arrangement of the radiation image sensing apparatus according to the fourth embodiment of the present invention.

A radiation image sensing apparatus 10 according to the fourth embodiment of the present invention will be described with reference to FIGS. 6A to 6C and 7. FIG. 6A is a sectional view in which the radiation image sensing apparatus 10 has been cut along a plane parallel to the x-y plane, FIG. 6B is a sectional view taken along line A-A of FIG. 6A, and FIG. 6C is a sectional view taken along a line B-B of FIG. 6A. FIG. 7 is an enlarged sectional view of a part of FIG. 6B. Matters not mentioned in the fourth embodiment can comply with the first to third embodiments.

The radiation image sensing apparatus 10 according to the fourth embodiment includes covering members 409 which cover the end faces of an array 103b which includes a plurality of photoelectric conversion elements and the end faces of concave portions 104c of a supporting plate 104. The positions of the end faces of a base portion 104b of the supporting plate 104 approximately match the positions of the end faces of the array 103b and a scintillator 103c. On the other hand, a substrate 103a projects outside the array 103b, the scintillator 103c, and the supporting plate 104. Steps are formed by the substrate 103a, the array 103b, the scintillator 103c, and the supporting plate 104. The covering members 409 are arranged so as to cover these steps. In the example shown in FIG. 7, one covering member 409 is arranged in a portion inside a virtual line 410 which connects the outer periphery of the substrate 103a and the outer periphery of the concave portion 104c of the supporting plate 104. The covering members 409 can be formed by a sponge-like material which has insulating and shock absorbing properties. Each covering member 409 can have a convex-curbed face on the outside to protect the corresponding connecting portion 107. Each connecting portion 107 can include a portion to be arranged along the surface of the corresponding covering member 409. The covering members 409 improves the strength of the structure formed by an image sensing panel 103 and the supporting plate 104.

Figure 8:
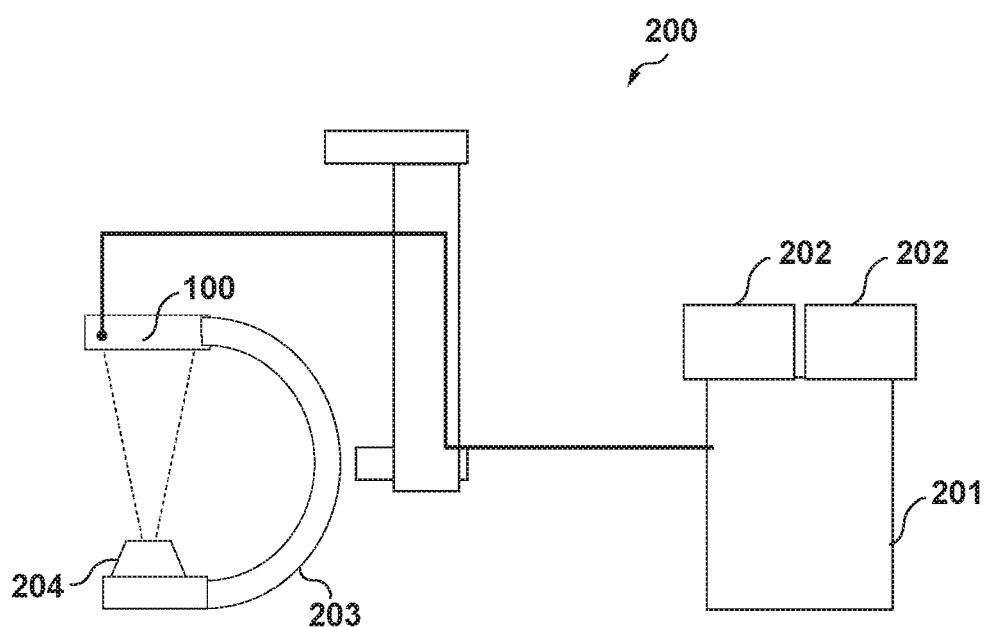
FIG. 8 is a view showing the arrangement of a radiation image sensing system according to an embodiment of the present invention.

An example in which a radiation image sensing apparatus 10 is applied as a radiation image sensing apparatus 100 to a C-arm radiation image sensing system 200 will be described below with reference to FIG. 8. The radiation image sensing system 200 includes a radiation source 204 that emits radiation such as X-rays, the radiation image sensing apparatus 100 that receives the radiation emitted from the radiation source 204 via an object to be inspected, a system control unit 201, and image displaying units 202. The radiation source 204 and the radiation image sensing apparatus 100 are arranged on a rotatable C-arm 203 so as to face each other. By rotating the C-arm 203 in a state in which the posture of the object to be inspected is not changed, the radiation irradiation direction to the object to be inspected can be changed. This allows 3D (three-dimensional) radiation image sensing to be performed. Each radiation image sensed by the radiation image sensing apparatus 100 is provided to the system control unit 201 and processed by the system control unit 201. The obtained 3D image can be output to the image displaying units 202. Driving of the C-arm 203 is done with acceleration and deceleration. Hence, the frame rate can be determined such that the object to be inspected is sensed at an equal angular interval independently of the acceleration and deceleration of the C-arm 203 during rotation of the C-arm 203.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-037294, filed Feb. 26, 2015, which is hereby incorporated by reference herein in its entirety.

What is claimed is:
1. A radiation image sensing apparatus comprising:
a housing an image sensing panel arranged in the housing and including a substrate having a surface, and an array having a plurality of elements two-dimensionally arranged on the surface of the substrate and configured to detect radiation;

a circuit component arranged in the housing and configured to drive the image sensing panel and process a signal from the image sensing panel;

a supporting plate arranged in the housing and including a first face on one side of the supporting plate and a second face on an opposite side of the supporting plate, the supporting plate being configured to support the image sensing panel and the circuit component, wherein the image sensing panel is supported by the first face so that the array is arranged between the surface of the substrate and the supporting plate in a state that the image sensing panel is arranged apart from the housing, and the circuit component is supported by the second face in a state that the circuit component is arranged apart from the housing;

a connecting portion arranged in the housing and having a first end connected to a region of the surface of the substrate, which is arranged outside the array, and a second end connected to the circuit component so that the image sensing panel and the circuit component are electrically connected with each other; and a joint configured to join the housing and the second face of the supporting plate so as to support the image sensing panel and the circuit component via the supporting plate, wherein upon an orthogonal projection onto a plane parallel to the first face, the supporting plate includes a first edge which is positioned inside an outer edge of the substrate and constitutes an outer edge of a concave portion of the supporting plate and a second edge which constitutes an outer edge of a projecting portion of the supporting plate, and the connecting portion passes through a space outside the first edge so as to electrically connect the array and the circuit component with each other.

2. The apparatus according to claim 1, wherein the second edge is positioned outside the outer edge of the substrate upon orthogonal projection onto the plane.

3. The apparatus according to claim 1, further comprising a spacer arranged between the projecting portion and the housing so as to determine a position of the supporting plate with respect to the housing.

4. The apparatus according to claim 3, wherein the spacer is fixed to the projecting portion, and the supporting plate and the image sensing panel supported by the supporting plate are arranged apart from the housing via the joint and the spacer.

5. The apparatus according to claim 3, wherein the housing includes a first plate portion and a second plate portion arranged in parallel to each other, and the spacer determines a position of the supporting plate with respect to the first plate portion.

6. The apparatus according to claim 3, wherein the housing further includes a frame portion comprising side walls of the housing, and the spacer determines a position of the supporting plate with respect to the frame portion.

7. The apparatus according to claim 3, wherein the substrate includes an end portion that projects outside, and the spacer includes a portion arranged between the end portion of the substrate and the projecting portion of the supporting plate.

8. The apparatus according to claim 3, wherein the spacer is configured to electrically insulate the housing and the supporting plate from each other.

9. The apparatus according to claim 3, wherein the spacer comprises an insulator.

10. The apparatus according to claim 1, further comprising a covering member configured to cover an end face of the array comprising the plurality of elements and an end face of the concave portion of the supporting plate.

11. The apparatus according to claim 10, wherein the connecting portion includes a portion arranged along a surface of the covering member.

12. The apparatus according to claim 1, wherein the supporting plate has a structure integrally comprising by the same material the projecting portion and a portion that supports the image sensing panel.

13. The apparatus according to claim 1, wherein the projecting portion and a portion that supports the image sensing panel of the supporting plate comprise a conductive material.

14. The apparatus according to claim 1, wherein the supporting plate includes four projecting portions.

15. A radiation image sensing system comprising:

a radiation image sensing apparatus; and a system control unit configured to obtain a radiation image sensed by the radiation image sensing apparatus, wherein the radiation image sensing apparatus comprises:

a housing an image sensing panel arranged in the housing and including a substrate having a surface, and an array having a plurality of elements two-dimensionally arranged on the surface of the substrate and configured to detect radiation;

a circuit component arranged in the housing and configured to drive the image sensing panel and process a signal from the image sensing panel;

a supporting plate arranged in the housing and including a first face on one side of the supporting plate and a second face on an opposite side of the supporting plate, the supporting plate being configured to support the image sensing panel and the circuit component, wherein the image sensing panel is supported by the first face so that the array is arranged between the surface of the substrate and the supporting plate in a state that the image sensing panel is arranged apart from the housing, and the circuit component is supported by the second face in a state that the image sensing panel is arranged apart from the housing;

a connecting portion arranged in the housing and having a first end connected to a region of the surface of the substrate, which is arranged outside the array, and a second end connected to the circuit component so that the image sensing panel and the circuit component are electrically connected with each other; and a joint configured to join the housing and the second face of the supporting plate so as to support the image sensing panel and the circuit component via the supporting plate, wherein upon an orthogonal projection onto a plane parallel to the first face, the supporting plate includes a first edge which is positioned inside an outer edge of the substrate and constitutes an outer edge of a concave portion of the supporting plate and a second edge which constitutes an outer edge of a projecting portion of the supporting plate, and the connecting portion passes through a space outside the first edge so as to electrically connect the array and the circuit component with each other.

16. The apparatus according to claim 1, wherein the image sensing panel includes a scintillator arranged between the surface of the substrate and the supporting plate and configured to convert radiation into light, the array including a plurality of photoelectric conversion elements two-dimensionally arranged on the surface of the substrate and configured to convert the light into an electric signal, and the supporting plate is configured to support the image sensing panel with the first face so that the scintillator is arranged between the surface of the substrate and the supporting plate.

* * * * *